United States Patent [19]

Rouhani

[11] Patent Number: 5,251,163
[45] Date of Patent: Oct. 5, 1993

[54] KEYPOINTER FOR SINGLE-HAND COMPUTER KEYBOARD

[76] Inventor: Sayd Z. Rouhani, 3028 Hartert Dr., Idaho Falls, Id. 83404

[21] Appl. No.: 818,773

[22] Filed: Jan. 13, 1992

[51] Int. Cl.$^5$ .............................................. G06F 3/02
[52] U.S. Cl. ........................... 364/709.12; 364/705.03
[58] Field of Search ................ 364/709.12, 709.11, 364/705.03; 400/479

[56] References Cited

U.S. PATENT DOCUMENTS

| | | | |
|---|---|---|---|
| 4,128,889 | 12/1978 | Ojima et al. | 364/705.03 |
| 4,151,596 | 4/1979 | Howells | 364/709.11 |
| 4,823,294 | 4/1989 | Rouhani | 364/709.12 |
| 4,891,777 | 1/1990 | Lapeyre | 364/709.15 |
| 4,964,075 | 10/1990 | Shaver et al. | 364/709.12 |

*Primary Examiner*—David H. Malzahn

[57] ABSTRACT

A keyboard for computers or electronic word processing systems comprising alphabetical, numerical, programmable, alternate, control, and shift keys, connected to a pen-like keypointer through a flexible wire. The keyboard can be used either as an ordinary input device for rapid data entry with two-hand touch-typing or, it can be used for single-hand operation in conjunction with the keypointer which is operable to press any of the keys on the keyboard for single-hand operation. The keypointer is equipped with a number of buttons on its barrel that function as the alternate, control, and shift keys, or some other specific function keys of the keyboard, such as the mouse buttons. The keypointer buttons are depressed by the thumb or the index finger to activate their function. In this manner the data entry is performed entirely by one hand. Preferably, the keypointer is equipped with a pen or pencil at its other end that can be turned down and used for handwriting. In one embodiment of the invention, the keypointer is constructed as an attachment to be connected to the computer through its own electronics interface box and function with any existing keyboard that is not originally equipped with a keypointer.

15 Claims, 3 Drawing Sheets

KEYPOINTER FOR SINGLE-HAND COMPUTER KEYBOARD

BACKGROUND OF THE INVENTION

1. Field of Invention

This invention relates to a data entering system for electronic computers and word processors. Its application is as a computer keyboard that can be used by one hand for those who have lost the function of one hand, or those who prefer single-hand operation of the keyboard, and yet, it can also be used in the customary way for two-hand typing by those who prefer ordinary touch-typing. The purpose is to make the same data entry devices useable for both handicapped and non-handicapped persons.

2. Description of the Prior Art

U.S. Pat. No. 4,823,294, issued to Rouhani, describes a compact keyboard particularly configured for single-hand operation. The basic features of the keyboard are small key surfaces surrounded by thin walls that separate each key from its neighboring ones. The keyboard does not have the usual controlling keys known as Alt (alternate) key, control key, and the shift keys. The compact keyboard is operated by a keypointer that has the appearance of a pen, with a small tip of rubber that is used to push down the keyboard keys. The keypointer is connected to the keyboard via a thin cable and, on its barrel, the keypointer is equipped with a number of keys or buttons that perform the functions of the Alt key, control key and the shift keys. The keypointer buttons can be depressed by the thumb or the index finger to activate each button's specific function. If none of the keypointer buttons are depressed, the tip of the keypointer may be used to push down any of the keyboard keys for sending that key's designated character or code to the computer or the data processing system. however, if one or more of the keypointer buttons are depressed by ones finger at the same time, the keyboard key will send a different character or code to the computer, just as on an ordinary keyboard operated by different fingers for producing a shifted character or a different code with the use of shift, Alt, or control keys.

Although very useful for single-hand operation, this keyboard can not be used for ordinary typing with two hands and the keyboard keys can not be pushed down by ones fingers easily. Hence, in a household or a working area where both professional typists and single-handed people have to share one computer or data processing system, it becomes necessary to have both an ordinary and a single-hand keyboard of the described type, and switch back and forth between them for the needs of different users.

The propose of the present invention is to provide a keyboard that meets the needs of ordinary touch-typing users, as well as, the needs of single-hand keyboard users in the same unit and, also, provide a keypointer with additional features for handwriting and additional buttons for sending other useful commands to the computer.

SUMMARY OF THE INVENTION

A primary object of the present invention is to provide a typewriter type keyboard of either an ordinary desk-top format, a portable size, or a very compact one, containing all the necessary alphabetical, numerical, programmable, alternate, control, and shift keys, connected to a pen-like keypointer through a flexible wire. The keypointer is equipped with a number of buttons on its barrel that function as the shift keys, the control key, the Alt key, or any other controlling keys that are used for sending different codes from each key of the keyboard to the computer or word processing system, in addition to other keys with special functions like the so called "mouse buttons" for clicking on desired icons on a computer monitor.

Another object of the invention is to provide a hand operated data entry system that can be used both as an ordinary keyboard for ten-finger touch-typing and, also, as a single-hand keyboard for complete operation by one hand.

Yet another object of the invention is to provide an improved keypointer that is equipped with controlling buttons such as the shift keys, the Alt key, the control key, or the like, on its barrel, with an elastic tip at one end, for pushing the keyboard keys, and a pen or pencil at its other end for handwriting.

A further object of the invention is to introduce an attachment as a pen-like keypointer with its own electronic interface (code generating circuitry) that can be connected via its own cable to a computer or word processor, in parallel with an existing full-size or compact keyboard, thereby making that keyboard operable by one hand.

BRIEF DESCRIPTION OF THE DRAWINGS

Other objects and advantages of the subject invention will become apparent from a study of the following specification when viewed in the light of the accompanying drawings, in which.

DETAILED DESCRIPTION OF THE INVENTION

Figure 1:
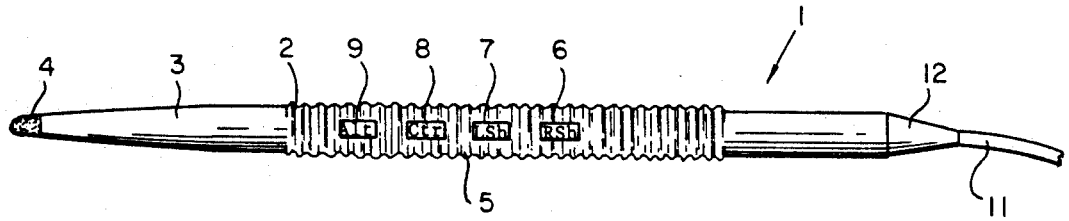
FIG. 1 is a top view of the keypointer of the present invention.

FIG. 1 shows top view of the improved keypointer that can be used in connection with a keyboard of any size or configuration for single-hand operation. The keypointer 1 includes a main body 2, which is a hollow barrel having a tapered lower end 3 that leads to a small tip 4 for pushing the keys on the keyboard. The tip 4 is made of hard rubber or elastomer in order to prevent noise and slippage, in contact between the tip and the key tops. The outside surface of the middle part of the keypointer barrel is made with a rippled surface 5 in order to provide more friction and a better grip between the fingers. Within this middle part 5, the keypointer has a number of buttons 6, 7, 8, and 9 that protrude outside of the barrel, as shown in a side view in FIG. 2, to be accessible for pressing by the finger of a user. The keypointer buttons 6, 7, 8, and 9 are placed close enough to each other to facilitate simultaneous depression of two adjacent buttons, such as the right-shift 6 and the left-shift 7, left-shift 7 and control 8, or Alt 9 and control 8 together, as may be needed by many existing software. Yet, the buttons are far enough from each other for individual manipulation without interference with the neighboring buttons.

The arrangement of buttons in FIG. 1 is just one example of the possible functions and configuration of the keypointer buttons. There may be additional or different buttons for other functions, and their relative placements may be varied for various applications.

The keypointer barrel may have a cylindrical cross-section or, alternatively, it may be hexagonal, triangular, or of any other desirable cross-section.

Figure 2:
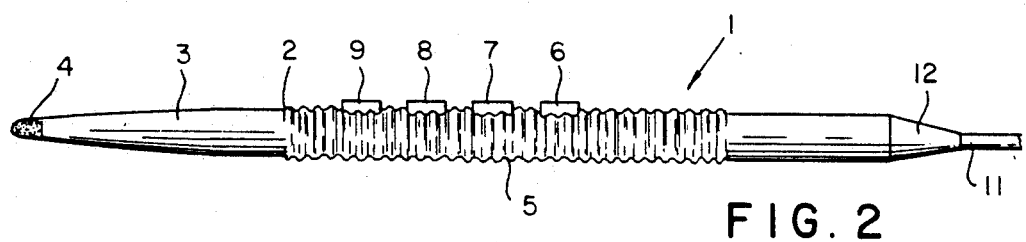
FIG. 2 is a side view of the keypointer of FIG. 1.
Figure 3:
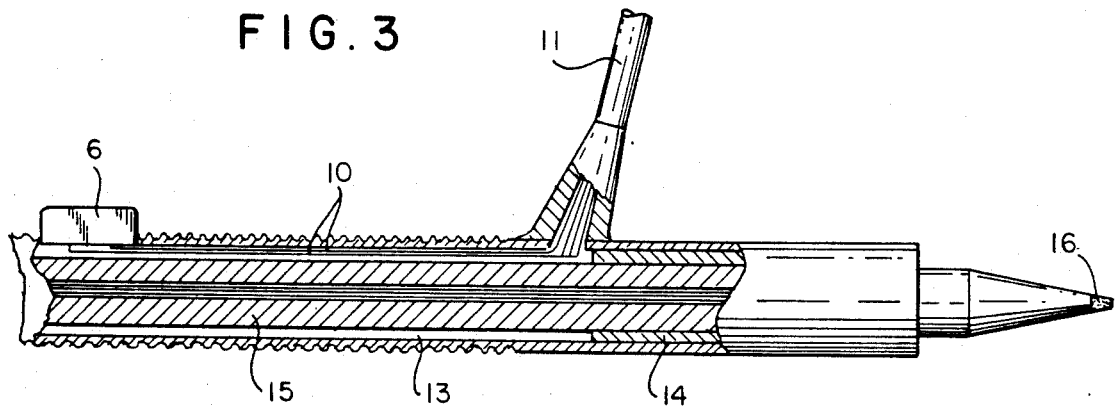
FIG. 3 is a partial sectional view of one embodiment of the keypointer barrel, showing a special cable connection and housing for a pencil in the upper part of the barrel.

Each of the buttons 6 through 9 may be made as a so called collapsing elastomer dome with a piece of conducting rubber underneath for establishing electrical contact or, alternatively, it can be just the upper part of a membrane type micro-switch. In general, there are many conventional methods of manufacturing small push-button switches, with or without tactile feedback, that can be employed for this application. As shown in FIG. 3, underneath each of the buttons 6 through 9 there are thin insulated connectors 10 that lead to a flexible multi-connector cable 11, through which the keypointer is connected to the keyboard, or to a special electronic circuitry that is in turn connected to a computer or word processor. Normally, four connectors that lead to two rows and two columns of the keyboard matrix are enough to provide four switching alternatives in the keypointer. An additional lead would provide for six switching alternatives. This makes it possible to include some programmable buttons or buttons with extra function capabilities that may be additional to those existing on the keyboard, or act as duplicates of some of the keyboard keys. These additional buttons may be assigned the functions of so called "mouse" buttons, such as the one used for "clicking" on certain program icons in some computer applications. In general, these buttons are used to send specific commands to the computer, depending on the software application. As an example, these additional buttons can be programmed to function as the PAGE-UP and PAGE-DOWN keys of the keyboard that are frequently used in connection with some types of graphics or word processing software. For a plain keypointer, the flexible cable 11 is connected to the upper end of the keypointer 12, as shown in FIGS. 1 and 2. However, as indicated in FIG. 3, the flexible cable 11 may be connected to the keypointer barrel on its top or side wall in order to use the upper end of the keypointer like a pen or pencil. In its simplest embodiment, the inner cavity 13 of the keypointer is fitted with a collar ring 14 such that it can hold a pen 15 or a shortened ordinary pencil, with the writing tip 16 protruding up when the keypointer is being used to depress the keyboard keys. By simply flipping the two ends, the keypointer can be used as a pen or a pencil for handwriting. This feature is particularly needed in many clerical tasks where some kind of writing or annotation is necessary after every few keystrokes on the keyboard. Another application of this handwriting feature is on the special surface or screen of some pen-based computers. A more elaborate design of this feature is possible by incorporating a specially designed pen or pencil, with a twisting retractable tip, as a continuation of the keypointer barrel that may be screwed onto the barrel.

Figure 4:
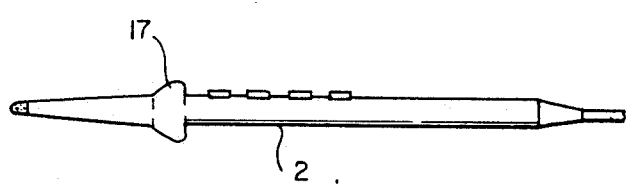
FIG. 4 is an alternative embodiment of the keypointer to that of FIG. 1.

In FIG. 4 there is shown an alternative means of providing a better grip on the keypointer barrel. In this arrangement, the keypointer barrel 2 is equipped with a short section of enlarged outer periphery 17, just below the lowest button, towards the tip, in order to provide a finger rest that prevents downward gliding of the finger grip on the keypointer during prolonged typing.

Figure 5:
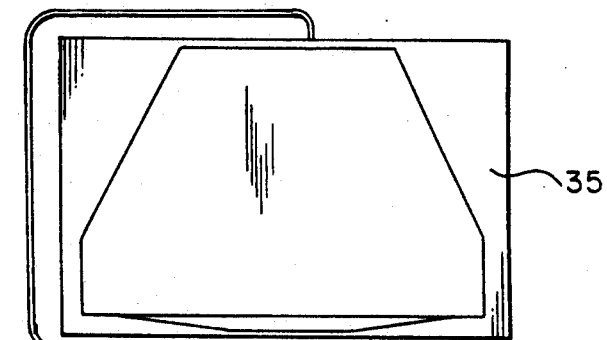
FIG. 5 is one embodiment of the configuration of the keyboard, keypointer and computer.

FIG. 5 shows schematically a preferred configuration of the keypointer 1, the keyboard 18 and the computer or word processor 35. Cable 11 that connects the keypointer 1 to the keyboard 18, consists of a number or wires that are electrically connected to the so called rows and columns of conductors inside the keyboard. These are special rows and columns that lead to the keys with functions identical to those duplicated by the buttons on the keypointer. As an example, the row and column connectors that lead to the left-shift inside the keyboard are electrically connected to the wires that lead to the left-shift button on the keypointer. In this manner, the keypointer buttons are simply parallel switches with their corresponding ones on the keyboard. Closing either one of these switches will have exactly the same effect on the rest of the keyboard and the computer.

Figure 7:
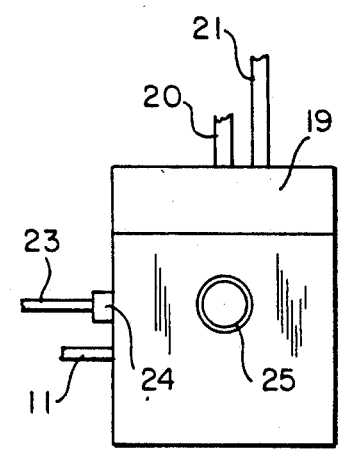
FIG. 7 is a top view of the keypointer electronics interface box of FIG. 6.
Figure 6:
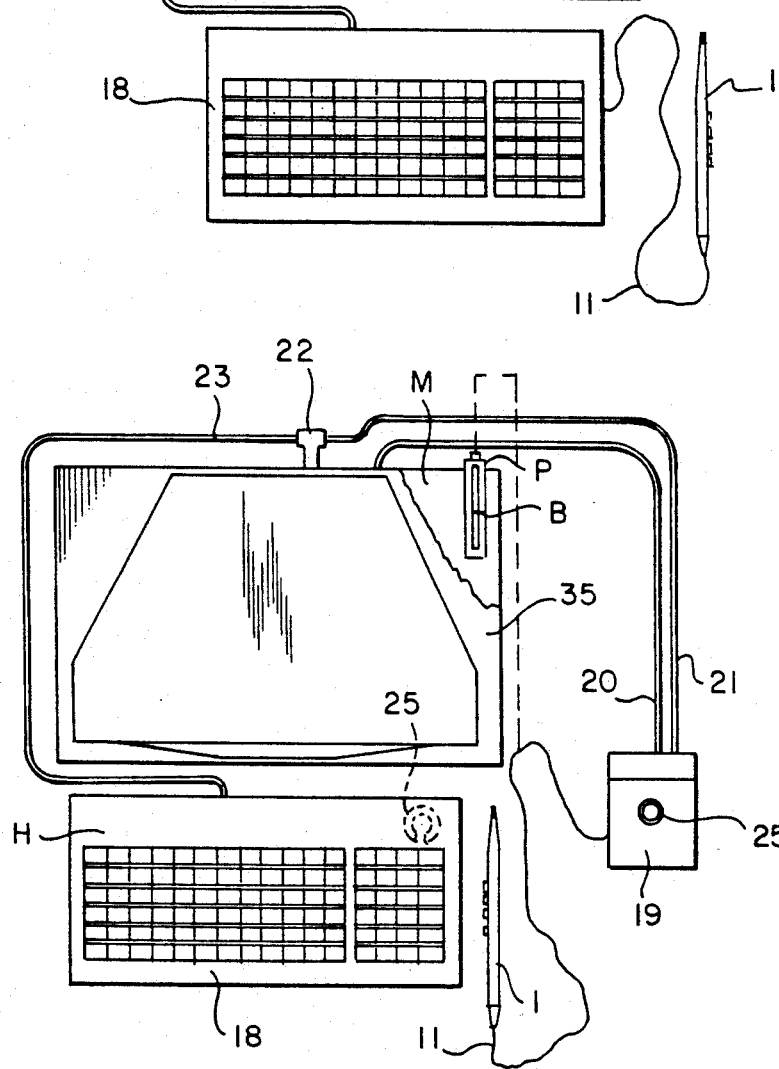
FIG. 6 is an alternative embodiment of the configuration of an ordinary keyboard attached to a keypointer with its own electric interface box and connected separately to a computer.

The cable connection to the keyboard, indicated in FIG. 5, is only for a keyboard that is specially made to operate with this keypointer. However, for existing keyboards that are not equipped with connections for this kind of keypointer, the keypointer cable 11 leads to a keypointer interface box 19, as shown in FIG. 6, that contains a separate electronics system for encoding the keypointer button contacts and sending a set of its own codes to the computer or word processor 35, through a different cable 20. In this arrangement, cable 20 may be connected to the computer 35 through a serial port. However, a separate connection to the computer, through the voltage carrying and the ground wires of the main keyboard cable, is necessary in order to tap the low voltage driving potential source inside the computer. These lines are not accessible through the serial port. For this reason, as indicated in FIG. 6, the interface box 19 has a third cable 21 that consists of two wires leading to an interconnecting piece 22 that is inserted in the path of the ordinary keyboard connector 23 for accessing the driving potential and ground connections that are used by the main keyboard. Alternatively, as shown in FIG. 7, the interface box 19 can be configured to have a receptacle 24 for the main keyboard connector 23 and internally, inside the box, redirect all of keyboard wires to the computer through a bigger cable 21, with five or six wires and, inside the box, provide access to the voltage source and ground connections that are carried through two of those wires.

Figure 8:
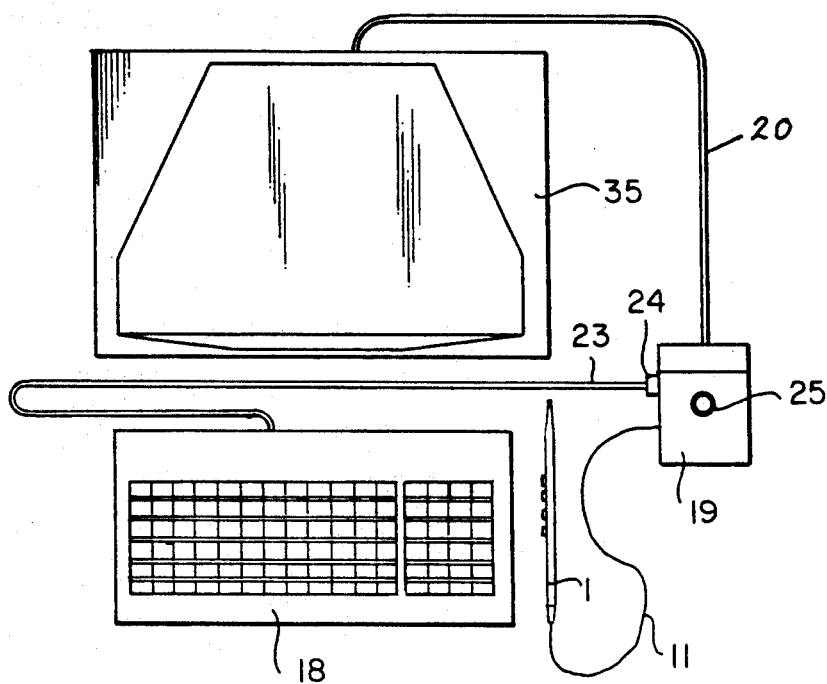
FIG. 8 is an alternative configuration of an ordinary keyboard attached to a keypointer with its own interface, using a common cable for connection to the computer.

The interface box 19, or the housing H of keyboard 18 (FIG. 6), may also serve as a holder stand for the keypointer. For this purpose, as shown in FIGS. 6, 7, and 8, the top cover of the interface box 19 is provided with a cavity 25 that serves as a receptacle for the keypointer.

The electronics in the interface box 19 include a small microprocessor that senses the closure of any of the keypointer buttons and sends a particular signal associated with that button to the computer. This is just the same process as used in every keyboard for the different keys, except that in this case it is used only for the few keys of the keypointer. A specially written program, to be called keypointer driver, is residing in the computer memory and, for each communicated signal from the keypointer, it interprets the code that is received simultaneously from the ordinary keyboard, and generates the code that would have been received if one had pushed the equivalent controlling key on the keyboard itself. When none of the keypointer buttons are activated, the resident program will not impose any alteration on the signals received from the main keyboard.

The electronic functions of the keypointer interface box 19, including the functions of the keypointer driver program, can be built on a separate electronics board B that could be mounted on the so called "mother board" M inside a computer 35 (FIG. 6), providing access to the driving voltage and ground connections directly in the computer, and having its own dedicated port P for the keypointer connection.

The keyboard 18 may have any number or configuration of keys, depending on the computer, word processor, or special data processing system that is attached to it. The keys of the keyboard may be of the ordinary type with projected tops that require a certain travelling before actuation, or the keyboard may be of the membrane type with a flat surface or "sculptured" key tops, displaying only the appearance of a keyboard and requiring little or no movement of the key symbols, but only a slight touch for actuation.

Figure 9:
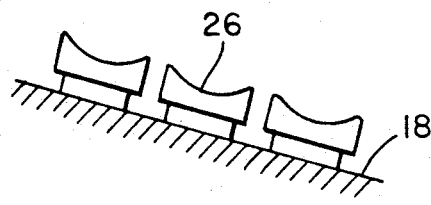
FIG. 9 is a sectional side view of one embodiment having concave keyboard keys for use with a keypointer.
Figure 10:
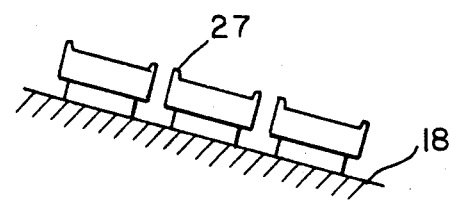
FIG. 10 is the sectional side view of an alternative embodiment of keyboard keys with raised edges for use with a keypointer.

In a special embodiment, the keyboard 18 may be made with keys that are particularly designed for easier operation with a keypointer. As shown in FIG. 9, the key tops 26 are made considerably concave to prevent any potential slippage of the keypointer tip that may cause unintentional touching of a neighboring key. In yet another special arrangement, shown in FIG. 10, each key top may be made with a slightly raised edge 27 all around its periphery for the purpose of preventing the keypointer tip from sliding off and activating a neighboring key. This is particularly needed in a miniaturized keyboard that must have smaller key surface areas.

While in accordance with the Patent Statutes, the preferred forms and embodiments of the invention have been illustrated and described, it will be apparent to those of ordinary skill in the art that various changes and modifications may be made without deviating from the inventive concepts set forth above.

What is claimed is:

1. A data entry device for use in inputting data to a data processing device, comprising:
   (a) a keyboard electrically connected with said data processing device including a plurality of data keys and a plurality of signal controlling keys, wherein at least some of said data keys are operable to send to said data processing device a first signal when said data key is depressed, and a second signal, which is distinct from said first signal, when one of said signal controlling keys is simultaneously depressed with said data key;
   (b) a hand-held keypointer electrically connected with said data processing device having one end which is operable to depress said data keys on said keyboard, and further wherein said keypointer includes a plurality of signal controlling buttons thereon, each of said signal controlling buttons corresponding to and providing the same function as one of said signal controlling keys; and
   (c) electronic interface means for electrically connecting said keypointer with said data processing device, said interface means being operable to receive signals from said keypointer and send said signals to said data processing device, said data processing device being loaded with a keypointer driver program which interprets said signals received from said keypointer and said keyboard and modifies said keyboard signal in accordance with said keypointer signal, thereby to permit said data entry device to be used as a standard two-hand keyboard or as a single-hand keyboard.

2. A data entry device as defined in claim 1, wherein said signal controlling keys include a left shift key, a right shift key, a control key and an alternative key, and further wherein said keypointer includes signal controlling buttons which correspond to each of said signal controlling keys.

3. A data entry device as defined in claim 1, wherein said keypointer includes at least one signal button that performs a function not performed by any of said signal controlling keys of said keyboard.

4. A data entry device as defined in claim 3, and further including an additional signal button which performs the function of a mouse button.

5. A data entry device as defined in claim 1, wherein said keypointer includes a writing instrument connected therewith.

6. A data entry device as defined in claim 1, wherein said data keys include a concave upper surface for preventing said keypointer from sliding off said keys.

7. A data entry device as defined in claim 1, wherein said data keys include a flat upper surface and raised edges around said upper surface thereby preventing said keypointer from sliding off said keys.

8. A data entry device as defined in claim 1, wherein said data keys are membrane-type keys.

9. A data entry device as defined in claim 8, wherein said membrane-type keys include raised boundary portions (27).

10. A data entry device as defined in claim 1, wherein said signal controlling buttons are membrane-type buttons.

11. A data entry device as defined in claim 1, wherein said interface means is provided on a circuit board (B) which is installed inside the data processing device and includes a dedicated connection port (P) for the keypointer.

12. A data entry device as defined in claim 1, wherein said interface means includes its own housing separate from said data processor, said housing including a means for holding said keypointer.

13. A data entry device as defined in claim 1, wherein said interface means is provided as an integral part of said keyboard.

14. A data entry device as defined in claim 13, wherein said keyboard includes a housing (H), said housing including means (25) for holding said keypointer.

15. A data entry device as defined in claim 1, and further comprising electronic interface means which electrically connect said keypointer and said keyboard to said data processing device through a regular keyboard connection port, said interface containing a complete recording electronics system for modifying the said keyboard signals in accordance with said keypointer signals.

* * * * *